United States Patent [19]
Chapman, IV

[11] Patent Number: 5,767,390
[45] Date of Patent: Jun. 16, 1998

[54] SYSTEM AND METHOD FOR STORAGE SYSTEM LEAK DETECTION

[75] Inventor: Calvin C. Chapman, IV, Pipe Creek, Tex.

[73] Assignee: Environmental Fuel Systems, Inc., Bandera, Tex.

[21] Appl. No.: 664,111

[22] Filed: Jun. 14, 1996

[51] Int. Cl.$^6$ .................................................. G01M 3/20
[52] U.S. Cl. ........................................ 73/40.7; 73/49.2
[58] Field of Search ............................... 73/49.2 T, 40.7, 73/864.71, 863.21

[56] References Cited

U.S. PATENT DOCUMENTS

| | | | |
|---|---|---|---|
| 2,284,147 | 5/1942 | Herrick | 73/863.21 X |
| 4,709,577 | 12/1987 | Thompson | 73/40.7 |
| 4,725,551 | 2/1988 | Thompson | 436/3 |
| 4,754,136 | 6/1988 | Blakely | 73/49.2 T |
| 4,863,494 | 9/1989 | Hayes | 55/59 |
| 4,993,874 | 2/1991 | Klusman | 73/863.21 X |
| 5,003,813 | 4/1991 | Hayes | 73/49.2 |
| 5,048,324 | 9/1991 | Thompson | 73/40.7 |
| 5,235,863 | 8/1993 | Bailey et al. | 73/863.21 X |
| 5,447,055 | 9/1995 | Thompson et al. | 73/40.7 X |

*Primary Examiner*—Michael Brock
*Attorney, Agent, or Firm*—Baker & Botts, L.L.P.

[57] ABSTRACT

A leak detection system and method for detecting leaks from a storage system containing a liquid, the leak detection method includes mixing one or more tracers soluble in the liquid to provide a liquid-tracer mixture within the storage system. The tracer provides a detectable component in the liquid-tracer mixture if the liquid-tracer mixture escapes the storage system through a leak. A subsurface sampling device is positioned near the storage system. The sampling device contains an adsorption material for adsorbing tracer from the liquid-tracer mixture that leaks from the system. The adsorption material is a hydrophobic, porous material. In one embodiment, a plurality of sampling devices are contained within a plurality of subsurface monitoring wells positioned around the storage system.

22 Claims, 2 Drawing Sheets

SYSTEM AND METHOD FOR STORAGE SYSTEM LEAK DETECTION

TECHNICAL FIELD OF THE INVENTION

The present invention relates generally to leak detection systems and methods, and more particularly, to a system and method for detecting a leak in a storage system by detecting a tracer chemical released in the storage system.

BACKGROUND OF THE INVENTION

Underground storage tank (UST) and above-ground storage tank (AST) integrity testing has become a lucrative market, driven partly by regulatory requirements and partly by sound environmental protection policy. Various systems and methods for leak testing of storage tanks and pipelines, often used for petroleum crude or refined-product storage and transport, have been introduced to meet this need. One method to detect leaks in these vessels and pipelines involves adding a specialty compound or mixture (called a "tracer") to the product being stored or moved that is both soluble in the product and not ordinarily present in the product or in the environment. Subsequent detection of this tracer compound or mixture outside the vessel or pipeline system can demonstrate that the tracer mixture has escaped the system, thereby indicating the system has developed a leak.

A typical tracer release detection application involves blending a tracer such as sulfur hexafluoride ($SF_6$) (a nontoxic, inert gas) with petroleum-related products in a pipeline or storage tank. Halogenated nonpolar compounds, halogenated methanes, halogenated ethanes, halogenated propanes and propenes, halogenated butanes, cyclobutanes and butenes have also been used as tracers to test fuel storage and pipeline systems. Tracer compounds have also been used to locate the underground presence and/or movement of water, soil gases, petroleum, or natural gas. Tracers have also been used to help define the presence and continuity of geologic faults and permeable formations. In each case, the specialty compound or mixture, soluble in the phase or medium of interest and not ordinarily present in the environment, is introduced at a particular location. Successful sampling for the tracer at points removed from the original release point then indicates "communication" with or "continuity" to the original release point.

Conventional tracer release detection methods to detect fuel leaks involve analyzing soil vapors drawn from sampling wells surrounding the fuel storage system for evidence of the tracer escaping the storage system. Typically, companies using tracer-related test methods locate sampling wells in the soil adjacent to fuel storage equipment. A background sample is usually taken prior to introducing the tracer compound into the fuel storage system to provide a baseline for the soil surrounding the storage tank prior to the actual tracer-related test.

After installing sampling wells and taking background tracer measurements, a technician will typically introduce one or more tracer chemicals (in either gas or liquid phase) into the fuel storage system. A predetermined mass of tracer(s) is inserted into the fuel storage system through a single tubing line inserted into the storage tank. An alternative tracer introduction system can involve placing an enclosed gaspermeable membrane containing a given mass of tracer(s) into the storage tank and having the tracer release through the membrane over a period of time. If a storage system has a leak, the tracer may escape the storage system with the fuel.

After some time period has elapsed, a technician uses a vacuum pump attached either to the top of the sampling well, or to tubing placed into the well, to draw soil vapors through the bottom end of the sampling well into a sample container. Typically, some portion of the soil vapor sample in the container is injected into a gas chromatograph equipped with an electron capture detector (ECD) to analyze the vapor sample for the presence of the tracer. These test samples are then compared to the background samples to determine if a product leak exists.

These conventional tracer release leak detection systems have several limitations.

For storage tank testing by tracer techniques, the desired physical properties of tracer compounds include high volatility. A compound's boiling point is often a good indicator of volatility. For example, $SF_6$ boils at about $-50.7°$ C., making it relatively volatile at ambient temperatures. However, the more volatile a tracer compound, the harder it is to keep that compound near a sampling point, in a sample container, or in an analytical system such as a gas chromatograph, an autosampler or a gas sampling loop/injector. Volatile tracers require care to insure the integrity of sample containers and analytical system components Conventional tracer release detection systems avoid using tracers more volatile than $SF_6$ for these reasons (and some systems use tracers even less volatile than $SF_6$), sacrificing analytical sensitivity and volatility for a decreased risk of accidental or cross-contamination.

Conventional tracer release detection methods using a soil vapor sampling system do not always collect adequate masses of tracer from the tracer-affected soil vapor space near or in the sampling well to detect relatively small amounts of tracer released from a leaking storage system. These conventional systems only pull the soil vapor sample from the relatively small volume opening at the bottom end of the sampling well. Thus, relatively small leaks may go undetected in the soil vapor sampling tracer detection systems. This problem can be exacerbated by low-permeability soil conditions surrounding the sampling wells. This problem can also limit the ability to accurately identify the location of a leak.

Conventional tracer release detection systems must also find a way to exclude or remove water from the vapor sample when using halogenated hydrocarbons or other electronegative compounds (such as sulfur hexafluoride) as a tracer. This must be done because an electron capture detector has relatively high sensitivity to water. The steps taken in conventional systems to exclude or remove water from the sample can potentially degrade the quality and/or the quantity of the sample.

Conventional soil vapor sampling tracer release detection systems using a vacuum pump and a container to hold the extracted soil vapors typically pull soil vapor samples from a sampling well for two to twenty minutes. The system is therefore limited to acquiring tracer sample that is present within, or in very close proximity to, the sampling well air space during that relatively short time period. The lack of a concentrating mechanism in these systems can allow the tracer to migrate away from the sampling well and be missed during the sampling process. This "short-term" sampling process can result in missing tracer releases because the tracer has 1) already declined below detectable concentrations within and near the sampling well, or 2) has migrated away due to subsurface soil conditions, weather conditions or other factors.

Conventional soil vapor sampling tracer release detection methods sample soil vapor by processes that result in a smaller mass of tracer collected. A low concentration accidental contamination of a sample has a higher likelihood of producing a "false positive" test result with a conventional, lower-mass tracer sample than with a higher mass tracer sample as can be taken using the present invention.

Conventional tracer release detection methods use a single delivery tube to introduce tracer into the fuel. As a result, the tracer disperses less rapidly and less uniformly throughout the fuel. This can lead to fuel leaking out that contains a less than optimal concentration of the tracer. This, in turn, can increase the difficulty of detecting the tracer, and ultimately, the leak.

Conventional tracer testing methods present a problem if a leak is at the bottom of a tank that has collected water at the bottom of the tank. While the tracers currently used have high solubility in fuel, they have low solubility in water, and therefore, a leak may go undetected.

SUMMARY OF THE INVENTION

The current invention improves on existing methods of tracer introduction into storage tanks, and of sampling for tracers outside those tanks and their associated equipment, such as lines and dispensers.

In particular, the present invention provides a leak detection system and method for detecting leaks from a storage system containing a liquid. The leak detection method includes mixing a tracer soluble in the liquid to provide a liquid-tracer mixture within the storage system. The tracer provides a detectable component in the liquid-tracer mixture if the liquid-tracer mixture escapes the storage system through a leak. A subsurface sampling device is positioned near the storage system. The sampling device contains an adsorption material for adsorbing tracer from the liquid-tracer mixture that leaks from the system. The adsorption material is a hydrophobic, porous material. In one embodiment, a plurality of sampling devices are contained within a plurality of subsurface monitoring wells positioned around the storage system.

The present invention provides an important technical advantage by using an adsorption method with a porous, hydrophobic sampling material to collect a significantly greater mass of tracer. The adsorption material actually attracts and concentrates the tracer within the material. The larger mass of tracer collected in the sample results in the ability to detect smaller concentrations of tracer and smaller storage tank leaks.

The present invention provides another technical advantage by using a collection method that allows the use of tracer compounds even more volatile than $SF_6$(such as carbon tetrafluoride ($CF_4$), which boils at $-128.0°$ C.) These higher volatility tracer compounds are 1) more likely to leave tank through a leak; and 2) more likely to migrate through soil. This will increase the sensitivity of the process to smaller volume leaks.

The present invention provides yet another technical advantage by using an adsorption process that does not require any special precautions to exclude or remove water because the adsorption material will not adsorb water. Therefore, there is no concern with water collecting in the sample to interfere with the operation of an ECD. Furthermore, this reduces the likelihood of degrading quality and quantity of the sample.

The present invention provides another technical advantage by using a long-term passive tracer collection method. The adsorption material attracts, adsorbs and concentrates tracer to the sampling device. This provides the advantage of collecting larger masses of the trace sample. Furthermore, the continuous adsorption ensures that fluctuating or declining tracer concentrations in the proximity of the monitoring well do not go undetected.

The higher mass tracer sample provided by the adsorption method of the present invention also provides the technical advantage of reducing the likelihood that a low level accidental tracer contamination of a sampling device will lead to a "false positive" test result due to the increased mass of the tracer sample obtained using the present invention.

The present invention provides still another technical advantage by introducing the tracer into the fuel through fritted metal diffusers to provide more rapid and uniform dispersion of tracer into the fuel. The tracer/fuel mixture is, therefore, more even throughout the storage system.

The present invention provides another technical advantage by allowing a more accurate determination of a leak location due to the greater sample mass collected through passive tracer collection.

DETAILED DESCRIPTION OF THE INVENTION

Figure 1:
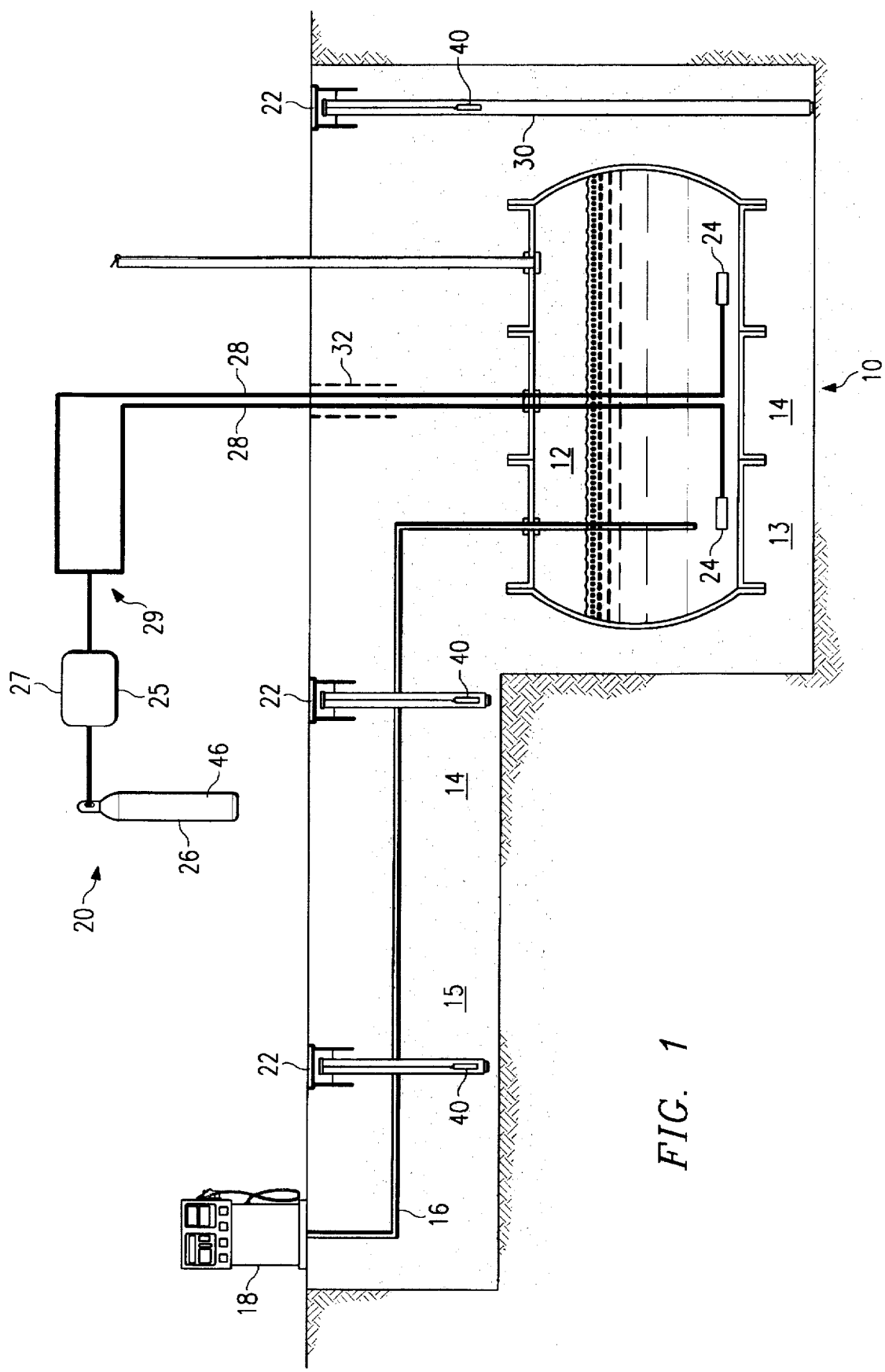
FIG. 1 shows a diagram of a fuel storage system including one embodiment of the present invention.

FIG. 1 illustrates a typical fuel storage system 10 including storage fuel tank 12. Fuel tanks 12 may be underground storage tanks (USTs) or above-ground storage tanks (ASTs). A typical fuel storage tank system, for example, at a retail service station or convenience store, can have two, three or four fuel tanks 12 (USTs) buried in a common excavation. It should be understood that the present invention relates to all types of storage systems including pipelines and other storage systems. It should be further understood that the product stored in the storage system can include products other than fuel.

As shown in FIG. 1, USTs are usually installed in excavation 13 on top of approximately one to two feet of sand or pea gravel backfill 14. Backfill 14 can then be added and compacted around fuel tank 12 until excavation 13 is properly closed. USTs often have paving over the backfilled excavation 13 with various pipes and fittings extending from the top of the fuel tanks through the backfill to the ground surface. Product delivery lines 16 connect product dispenser 18 to fuel storage tank 12. Product delivery lines 16 are usually placed in excavated trenches 15, surrounded with backfill 14, then covered to grade for paving.

As shown in FIG. 1, tracer release detection system 20 of the present invention includes a plurality of monitoring wells 22, and compressed gas cylinder 26 (containing a particular tracer 46) connected to gas regulator 25, flow controller 27, and valved tee 29. Valved tee 29 can connect to one or more transfer lines 28, each transfer line 28 coupled to a fritted metal diffuser 24 within storage tank 12.

Subsurface monitoring wells 22 can be installed when fuel tank 12 and product delivery line 16 are initially installed. Alternatively, monitoring wells 22 can be retrofitted into existing tank pits and line trenches. Backfill soil 14 around storage tank 12 and product delivery line 16 will preferably comprise pea gravel or sand. However, some fuel storage systems 10 use "native soil" backfill (i.e., the soil that was excavated from the tank pit prior to tank and line installation). Native soil can have low permeability that can limit tracer migration from storage tank 12 to monitoring wells 22. In any method of storage system leak detection, whether internal or external in nature, the permeability of the backfill soil will affect the sensitivity and accuracy of leak detection.

Monitoring wells 22 should preferably be sunk near storage system 10 and in sufficient quantity so that each monitoring well 22 is relied upon to sample from no more than a twenty foot radius around that monitoring well 22. It should be understood, however, that a greater or lesser number of monitoring wells 22 could be distributed around storage system 10. Monitoring wells 22 should preferably be spaced around the entire perimeter of storage system 10. As shown in FIG. 1, monitoring wells 22 are preferably installed at a depth equal to the depth of the bottom of the boundary of excavation 13 for USTs. However, the present invention has successfully detected tracer/fuel releases when monitoring wells 22 did not extend to the bottom of excavation 13. Due to the concentrating behavior of the sampling devices, the present invention can often detect the fuel and tracer vapors that migrate upward through the ground. Monitoring wells 22 are preferably placed within the backfill 14, however, monitoring wells 22 can also be placed in the native soil outside of backfill 14.

Figure 2:
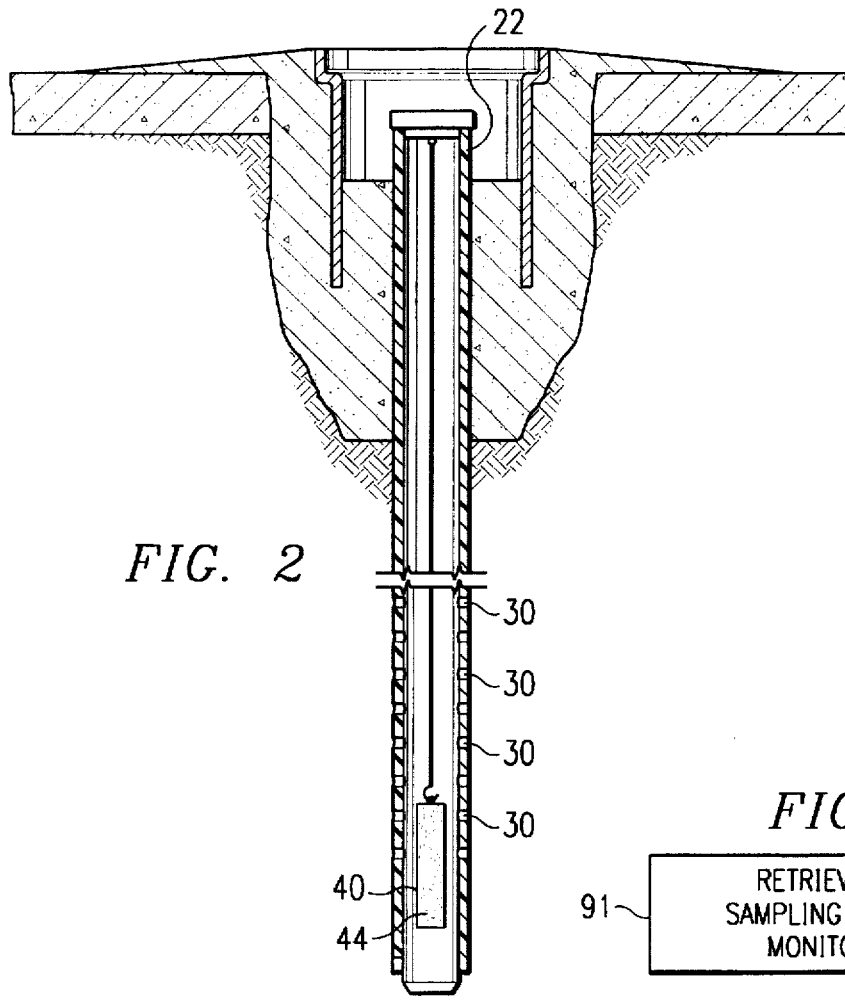
FIG. 2 shows a view in elevation of one embodiment of a sampling device to be used in conjunction with the present invention.

FIG. 2 shows one embodiment of monitoring well 22 having a slotted PVC casing 30 with an opening at the surface. Monitoring wells 22 of the present invention can be constructed to have a casing with a cylindrical cross-section of nominal diameter of one to four inches. Monitoring wells 22 can include PVC casings 30 that have slots cut in them to receive tracer and fuel vapor and liquid. The slots in the PVC casing 30 of monitoring well 22 can be horizontal slots approximately 0.010 to 0.020 inches wide and approximately 0.5 to 1.0 inches long. The slots can be cut around the diameter of the monitoring well 22 and can be spaced vertically along the length of the casing approximately 0.20 to 0.50 inches apart from one another. The slots in monitoring wells 22 allow tracer/fuel vapor to more easily migrate into the monitoring wells 22 to contact the sampling devices 40. Each monitoring well 22 includes sampling device 40 suspended within the monitoring well to collect tracer 46. An example of a monitoring well that can be used with the present invention is disclosed in U.S. Pat. No. 5,003,813, which is incorporated herein by reference.

As shown in FIG. 2, subsurface sampling device 40 is suspended in each monitoring well 22 through the surface opening of the monitoring well 22. The sampling device 40 is preferably suspended at a depth of approximately two to four feet below grade. In an alternative embodiment, the sampling devices 40 can be suspended in a subsurface excavation near the storage system 10 (not contained within monitoring wells 22). In yet another embodiment, the sampling devices 40 can be suspended above ground, rather than subsurface. Sampling devices 40 preferably comprise stainless mesh cylindrical containers, each container holding a mass (for example, 0.1 to 2.5 grams) of porous, hydrophobic adsorption material 44. An example of a porous, hydrophobic material 44 is an activated carbon. A preferred porous, hydrophobic adsorption material 44 is a synthetic polymer such as that disclosed in U.S. Pat. No. 4,863,494 which is incorporated herein by reference. This porous, hydrophobic material 44 reversibly adsorbs and concentrates both fuel and tracer vapors that contact the porous hydrophobic material 44 over the period of exposure.

Fuel storage system 10 can continue in operation during the entire tracer release detection process of the present invention including during a retro-fit installation of monitoring wells 22. The tracer release detection process of the present invention requires analyzing the test site (i.e., the area around storage system 10 where monitoring wells 22 are located) for the presence of any tracer compounds and possibly fuel prior to purposeful tracer introduction into fuel tank 12. This background test serves to establish a baseline of how much tracer is present at the test site prior to fuel tank 12 leak testing. Also, testing for the presence of particular fuel types can provide valuable information about the site contamination history. These background samples will provide baseline samples to compare to test samples exposed to the tracer and fuel during tracer release and leak detection testing. The background testing can be performed using the method described by the present invention, or alternatively, by conventional methods including soil vapor samples such as those described in the background of the invention.

After performing the background testing, an unexposed sampling device 40 is suspended in each monitoring well 22. Each monitoring well 22 is then sealed. Tracer chemicals 46 are chosen for introduction to each fuel tank 12 on site. Examples of tracer chemicals include, but are not limited to, sulfur hexafluoride, halogenated hydrocarbons, and krypton. Tracers 46 useful in the application of the present invention include those with high solubility, relatively low boiling points, and relatively high vapor pressures at ambient temperatures. Tracers 46 are preferably non-polar compounds, so that they are well-suited to adsorption by, and concentration on the hydrophobic, porous adsorption material. Tracers 46 include both gaseous and liquid compounds. For a site with multiple storage systems 10 or multiple storage tanks 12, a different tracer 46 can be introduced into each storage tank 12 in order to differentiate between tanks if tracer 46 release is detected. Additionally, two or more tracers 46 may be added to a single tank where, for example, the first tracer 46 is soluble in the liquid stored in the tank and the second tracer 46 is soluble in water.

To introduce tracer 46 to the fuel, a tracer introduction system including a container 26 containing tracer 46 can force tracer 46 to flow through the gas regulator and flow controller, into transfer lines 28. The tracer 46 can be introduced into the liquid in the storage system 10 in either a gas or a liquid state. Tracer 46 exits transfer line 28 through fritted metal diffuser 24, which has been placed near the bottom of tank 12 The present invention uses fritted metal diffusers 24 placed near the bottom of storage tank 12 to uniformly disperse tracer 46 to allow rapid mixing of tracer 46 with the liquid (for example a hydrocarbon fuel) throughout the tank 12 to produce a liquid-tracer mixture within the storage system 10. Fritted metal diffusers 24 provide rapid mixing and more uniform dispersion because as the tracer gas or liquid passes into the metal diffuser 24, it breaks the tracer into many small gas bubbles or liquid droplets. This allows tracer 46 to exit the fritted metal as many tiny droplets or tiny gas bubbles, depending on the phase. In this way, tracer 46 dissolves into the liquid stored in the tank much more rapidly. This process allows the liquid-tracer mixture to more rapidly reach an average concentration of tracer 46 throughout the liquid. In contrast, if gas-phase tracer 46 is introduced through ⅛ inch or ¹⁄₁₆ inch tubing without fritted exit diffusers, large bubbles issue from the tube end and rise to the liquid surface in a tank. Much of the tracer would remain in vapor phase in the tank, to be lost to atmosphere through vents required as part of the tank system.

Tracer 46 moves through transfer lines 28 into tank 12 at flow rates ranging from less than 30 milliliters to over 400 milliliters per minute. The total mass of tracer 46 needed to test a particular fuel storage system 10 depends on a variety of factors, including but not limited to, total tank volume, tank volume typically in use, approximate volume of fuel moved through tank in a month-long period, volatility of the fuel product, volatility of the tracer compound, permeability of backfill or native soil, ground-water level, soil moisture, and fraction of organic carbon in backfill or native soil. Typical masses of tracer 46 can range from less than 25 grams to greater than 1,000 grams per fuel storage tank 12.

Once the proper mass of tracer 46 has been introduced to storage system 10, the container 26 is removed from transfer lines 28. A nitrogen compressed gas cylinder (not shown) can then be connected to transfer lines 28. Nitrogen can be flowed through transfer lines 28 and fritted metal diffusers 24 for a period of time (typically several minutes), to force approximately all tracer 46 out of transfer lines 28 into tank 12. Transfer lines 28 and metal diffusers 24 are then removed from tank 12, and tank fill pipe 32 is sealed.

Sampling device 40 will remain exposed for a period of time. Porous, hydrophobic adsorption material 44 in sampling devices 40 will continuously attract and adsorb tracer 46 that leaks from tank 12. Soil vapors, occupying the spaces or voids between soil particles, are predominantly made up of the permanent gases (nitrogen, oxygen, argon and carbon dioxide) and water vapor. None of these compounds is adsorbed to any great degree by the porous, hydrophobic adsorption material 44. A non-polar vapor-phase molecule, such as a tracer 46, in the soil vapor exerts a vapor pressure and partial pressure. If such a tracer molecule comes into contact with the adsorption material 44, it physically bonds to the surface of the adsorption material 44, changing phase from vapor state to "sorbed" state. As part of this phase change, the tracer molecule no longer exerts a vapor pressure or partial pressure in the soil vapor, resulting in a lower concentration of that type of molecule near the sampling device 40. More molecules of that type then move into the affected volume, to re-equilibrate partial pressure and concentration. An equilibrium is typically reached after the adsorption device has concentrated the available tracer to levels hundreds or thousands of times greater than the ambient tracer concentration. Typical tracer sampling time may be as short as one to three days or longer than two to three weeks after tracer 46 introduction into the storage system 10. Variables that affect this sample exposure time include those previously identified as affecting the mass of tracer 46 introduced into a tank 12.

The present invention allows increased tracer mass collection using a monitoring well 22 having a slotted PVC casing. Whereas conventional systems often use sampling wells with a solid-wall casing and pull a vapor sample only from the bottom opening of the sampling well, the present invention samples using a monitoring well 22 having a slotted casing. The slotted casing monitoring well 22 exposes a sampling device 40 to soil vapors from the entire vertical extent of the monitoring well 22. This is especially important in view of the fact that most tracer compounds are denser than air. The majority of a tracer's mass will, therefore, sink through the soil vapor space, tending to concentrate against soils or rock of lower permeability, or ground water, typically deeper than the region in which sampling is taking place.

Figure 3:
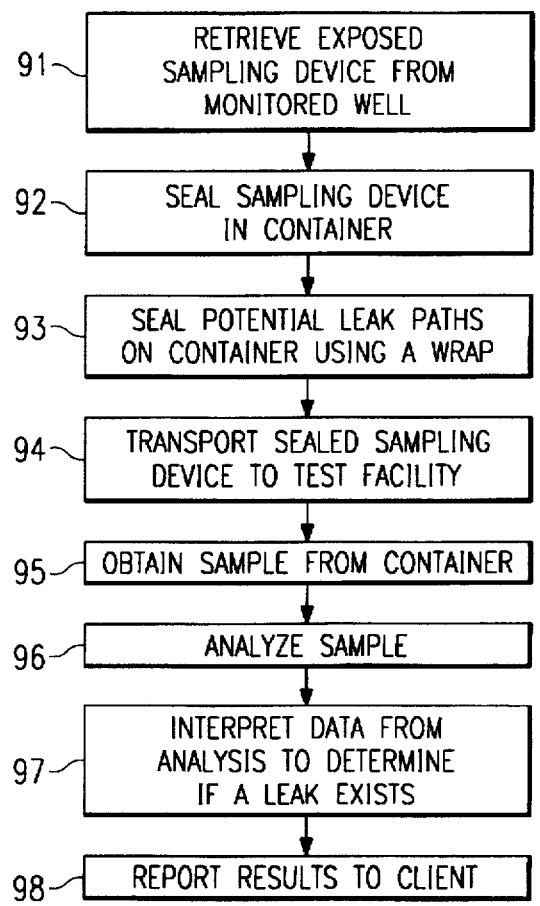
FIG. 3 shows a flow diagram of one embodiment of the sample handling and analysis of the present invention.

FIG. 3 shows a flow diagram of the sample device handling and analysis. As shown in step 91, once an appropriate amount of time has elapsed, exposed sampling device 40 containing adsorption material 44 is removed from each monitoring well 22. In step 92, the sampling device 40 containing adsorption material 44 is sealed in a container, for example in a glass vial having a screw-top or crimp-top lid. In step 93, all potential leak paths on the vial are sealed using a wrap. Potential leak paths include, for example, the screw top lid seals with the glass threads, seal in the lid presses, seal against the top of the glass vial, or the seal against the open top in the lid. A portion of the soil vapors in the sampling device 40, including a portion of the tracer mass, will separate from porous hydrophobic material 44 into the vapor in the container enclosing sample device 40. The wrap used to cover these potential leak areas can include a paraffin wax wrap, a metal wrap, or both. The sealed sampling device 40 is then transported to the testing facility in step 94. This testing facility can include a remote or on-site testing facility. A nonexposed sampling device 40 can be placed in each monitoring well 22 at this time to allow confirmation sampling at the same monitoring well 22, if necessary.

In step 95, a sample is then obtained from the container enclosing sampling device 40. The sample may be obtained from within the container in one of at least two ways: 1) the sample can comprise the headspace vapor in the container enclosing sampling device 40, or 2) the sample can comprise a liquid organic solvent aliquot obtained after the solvent is injected into the container to desorb the tracer from the hydrophobic material into the solvent. For a headspace vapor sample, a headspace auto-sampler 60 actually samples this headspace vapor for tracer. Without the paraffin (or other) wrap as a secondary hermetic seal, $SF_6$ (or other tracers 46 used) will escape the container and pose a threat for accidental contamination of other samples or system components. Using the paraffin or metal wrap method, tracer compounds even more volatile than $SF_6$ can be used and adsorbed, such as carbon tetrafluoride ($CF_4$), which boils at $-128.0°$ C. The present invention can use tracer compounds with boiling points lower than $-128$ degrees Celsius (for example, krypton) and greater than 150 degrees Celsius (for example, three-hexanol alcohol).

In step 96, the sample is analyzed. For a headspace vapor sample, the vapor sample, still sealed in a 40-milliliter (ml) vial, for example, is loaded into a headspace auto-sampler connected to a gas chromatograph. A headspace auto-sampler is the preferred device for analyzing a headspace vapor sample. By a set of automated steps, sample of headspace vapors from the container enclosing sampling device 40 is injected into gas chromatograph and separated on an analytical column in the chromatograph. The tracer 46 is then detected as discrete compound peak(s) at a detector. The detector can be an electron capture detector, which is the most sensitive detector currently available for detecting sulfur hexafluoride and the halogenated hydrocarbons (excluding the fluorinated hydrocarbons). For fluorinated hydrocarbons such as carbon tetra fluoride, a negative-ion mass spectrometer is currently the most sensitive detector. The detector can also include other mass spectroscopic detectors, a flame ionization detector, a helium ionization detector, a thermal conductivity detector, an electrolytic conductivity detector, a chemiluminescent detector or other element-specific detectors (oxygen, nitrogen, or sulfur, for example).

In the alternative method of washing the sampling device 40 with an organic solvent to form a liquid aliquot sample, a measured volume of liquid organic solvent is injected into the sealed vial holding the sampling device 40. The sampling device 40 and organic solvent are agitated for a period of time, to more completely desorb tracer 46 from the adsorption material 44, within the sampling device 40 to form liquid sample. After agitation, the liquid sample, now containing tracer 46 from the sampling device 40, is removed from the sealed vial and placed into an autosampler vial. The autosampler vial is then placed into an autosampler, for subsequent injection by a set of automated steps into a gas chromatograph for analysis.

Conventional sampling systems, using a vacuum pump to collect soil vapors into a sample container, must attempt to eliminate water vapor or liquid from the sample, as water interferes greatly in the operation of an ECD. These systems often include the use of water-permeable membranes, to preferentially remove water from an air stream. In contrast, the present invention uses the hydrophobic (water-rejecting), porous adsorption material 44 (such as a synthetic polymer) to passively adsorb and concentrate the tracer compounds. Because the material is hydrophobic, no water will collect in absorbent material 44 and only small amounts of water will absorb onto the surface of the stainless mesh exterior of sampling device 40. Therefore, no additional steps to exclude water from the sample, or from the analytical process, need be taken.

In step 97, the data obtained in step 96 is analyzed to determine if a leak has occurred. Numerical and spatial comparison of tracer concentration data obtained from the analysis of potentially tracer-exposed sample 50 (headspace vapor or liquid aliquot sample) with the concentrations of tracer present in the background samples 70 demonstrates whether tracer 46 has appeared outside the tank 12 or product line 16 in amounts greater than previously detected. A higher concentration of tracer 46 in the exposed sample (as compared to background sample 70) can indicate a tank 12, product line 16, or even a dispenser has leaked fuel into the ground near a monitoring well 22. The results of this analysis can then be reported to the client.

By comparing concentrations of tracer 46 at different monitoring wells 22, the approximate location of a leak may be estimated. For example, simple triangulation in soils of similar permeability points to a leak location in two dimensions. This can be improved upon based on site conditions, tank and other equipment geometries, and other factors. The nature of the adsorption material 44 and the extended sampling period of the present invention concentrates a more representative amount of tracer 46 at each monitoring well. Thus, a monitoring well closer to a leak will concentrate a larger mass of tracer, providing more accurate leak location information This more accurate leak location information can eliminate the need to excavate an entire tank pit or line trench to repair a leak. Rather, only a portion of the pit or trench may require excavation in order to repair a damaged storage system 10.

A storage system 10 can also include multiple storage tanks, any number of which may have leaks. One solution to this problem would be to introduce a different tracer compound into each tank. The present invention will adsorb a variety of tracer compounds. Thus, the present invention will allow a user to determine which tanks in a multiple tank storage system have leaks.

Furthermore, conventional tracer testing methods present a problem if a leak is at the bottom of a tank that has collected water at the bottom of the tank. In a fuel storage tank that has collected water, the water will separate to form a water level below the fuel level due to the density of water as compared to fuel. While the tracers currently used have high solubility in fuel, they have low solubility in water. Thus, the tracer will not dissolve in the water level at the bottom of the tank. If a leak develops at the bottom of the tank, the water will first escape, but no tracer will escape with the water. Thus, the leak will go undetected until the water level decreases to the point that fuel begins to leak. By using a tracer that is soluble in water and is adsorbable by the adsorption material (such as methylene chloride), the present invention can detect the leak.

Another important advantage of the present invention is the increased ability to detect relatively small leaks. By exposing sampling device 40 for an extended period of time, the process of the present invention relies on the porous, hydrophobic material 44 to selectively partition to its surface area the available tracer compounds. This sampling method of the present invention has several advantages over conventional short-term method of drawing of soil vapors into a sample container using a vacuum pump. The present invention allows the use of higher volatility tracer compounds such as carbon tetrafluoride. Conventional systems avoid using these higher volatility compounds, having lower boiling points, due to the fact that the more volatile compounds are more difficult to keep near a sampling point (such as in the soil vapors of a conventional sampling well). Because the present invention uses a sampling method that collects (through adsorption) the tracer on an adsorption material 44, the fact that the volatile compound will more easily migrate does not affect the present invention's ability to collect a tracer sample as dramatically as it does conventional tracer detection methods. Using a more volatile tracer provides the advantage that the tracer will more rapidly pass out of a leak in the storage system and more rapidly migrate to the sampling device in the monitoring well.

Furthermore, the present invention will likely collect a greater amount of tracer from a leak. Conventional tracer detection methods using short-term sampling by vacuum pump obtain sample sizes ranging from 1 to 50 liters of soil vapor. The short-term sampling runs the risk of missing a tracer's presence near a sampling well, since that tracer concentration in soil vapor may vary with changing soil humidity, rainfall events, shallow soil temperature changes, changes in atmospheric pressure, changing level of liquid product in the storage tank of interest, and other factors. In contrast, sampling over a period of many hours or days, by passive adsorption, helps to "average out" these variable factors, as well as obtain a larger mass of sample for analysis. Tracer masses equivalent to several hundred liters of soil vapor are routinely obtained using the passive adsorption on a porous hydrophobic material 44 of the present invention.

To illustrate the sensitivity of this tracer release leak detection process of the present invention, an electron capture detector can detect sulfur hexafluoride (one type of tracer 46) at a mass as low as 1 picogram ($1 \times 10^{-12}$ gram) in a sample injected into a gas chromatograph. If 250 grams of sulfur hexafluoride are mixed into 8,000 gallons of diesel fuel in a tank, each gallon of fuel may contain approximately 3.125 million picograms of sulfur hexafluoride. If, over a three-day period, 0.1 gallon of diesel fuel escapes from a break in the tank, a product line, or a dispenser, and moves into the backfill, there can be as many as 312,500 picograms of sulfur hexafluoride available in the backfill. Because the porous, hydrophobic material used in sampling devices tends to adsorb and concentrate sulfur hexafluoride, a detectable portion of the escaped sulfur hexafluoride will likely collect on one or more sampling devices.

To further illustrate, suppose that one-hundredth of the sulfur hexafluoride collects on an individual sampling device. This means that about 3,125 picograms of sulfur hexafluoride are available on the sampling device. Once the sampling devices are retrieved from the field and sealed in individual 40-ml vials, some of the sulfur hexafluoride desorbs from the porous, hydrophobic sorbent and becomes a part of the vapor in the vial. For the sake of numerical argument, suppose that one tenth of the sulfur hexafluoride from the sampling device desorbs into the vial vapor space, or headspace. This may represent as much as 312 picograms of sulfur hexafluoride in the headspace The gas chromatograph auto-sampler pulls what may be as much as one milliliter of vapor from the vial's 40-ml total volume, and injects that vapor into the gas chromatograph. This results in seven to eight picograms of sulfur hexafluoride in the sample, to be detected at the gas chromatograph's detector. Conventional tracer release detection devices may or may not be capable of detector this small a volume of tracer, from this small a leak.

An actual performance study using the present invention was conducted with the New Mexico Environment Department's Underground Storage Tank Bureau. At a site in Gallup, NM, eight monitoring wells were placed into undisturbed native soil. These wells were positioned as follows: one well, in the center of a circular pattern (the "central well") was placed to a depth of about 14 feet below ground surface (BGS), and was screened from 13 to 14 feet with slots in the casing. Casing without slots extended from 13 feet BGS to approximately one foot above ground surface. Around the casing, sand was packed from 14 feet BGS back to about 11.5 feet. Above the sand, bentonite clay was packed back to 0.5 feet BGS, to assure that no high permeability path for vapor travel existed above 11.5 feet BGS along the casing or the boring edges. The well was then finished to grade with concrete.

Four monitoring wells were placed in a circular pattern, spaced 90 degrees apart from one another at distances of six feet from the central well. Each of these wells was sunk to 9.5 feet BGS and screened from about 9.5 feet to 4.5 feet BGS. Around each well casing, sand was packed from 9.5 feet to about 4 feet BGS. Above the sand, bentonite clay was packed back to about 0.5 feet BGS. The well was finished to grade with concrete.

Four more sampling wells were placed nine feet from the central well, in a similar configuration to those placed at six feet from central well.

At a distance of 15 feet from the central well, one monitoring well was placed, identical in construction to those placed at six and nine feet from the central well. This well lay northwest of the central well, on a common axis with four sampling wells and the central well. The remaining four sampling wells lay on a northeast-southwest axis, passing through the central well.

Upon completion of all wells, sampling devices were placed in each well. After a two-week exposure period, all "background" sampling devices were removed and tested for presence of sulfur hexafluoride. No sulfur hexafluoride was detected at greater than five picograms per liter of vapor.

Clean sampling devices were placed in all sampling wells, with two devices placed in each of the sampling wells at six and nine feet from the central well. These paired devices were set at depths of three and nine feet BGS.

After all sampling wells were properly sealed, sulfur hexafluoride was flowed into the central well, or sample introduction well. It was flowed at 200 milliliters per minute for 20 minutes, which put approximately 25 grams of sulfur hexafluoride in the sample introduction well.

The monitoring wells were placed to the depths chosen because a low permeability soil, with high clay content, was present at depths of about 9.5 to 12 feet below ground surface. This soil was sampled and analyzed for hydraulic conductivity and other parameters. One US EPA-approved method of UST monthly monitoring requires soil to have a hydraulic conductivity greater than 0.01 centimeter per second (cm/s). This tight soil was found, through independent testing, to have a hydraulic conductivity of $2.6 \times 10^{-8}$ cm/s. This indicated that some portion of the soil column between 9.5 and 12 feet BGS was approximately 300,000 times less permeable than the 0.01 cm/sec "minimum" hydraulic conductivity called for by EPA regulations in ground-water surface monitoring. In these low-permeability soil conditions, where the tracer compound had to travel out of the central well casing, upward at least two feet through this very low permeability soil, then laterally to the monitoring wells, sampling devices were analyzed after 24 hours, seven days, 14 days and 28 days. After only 24 hours, the tracer was detected on all sampling devices at all wells except for the one 15 feet away, which was not sampled until two weeks later. At seven days, tracer was detected at all wells six and nine feet from the central well. At 14 days and 28 days, the tracer was detected on all sampling devices at all wells, at concentrations as high as 25 micrograms per liter (25 million picograms per liter) of headspace.

In UST backfills, permeability of disturbed native soil—which is the worst soil condition encountered—is believed to be much greater (more favorable for vapor movement) than $10^{-8}$ cm/s. For the example of sulfur hexafluoride mixed in diesel fuel described above, where only 3.125 milligrams of tracer would get outside a tank if 0.1 gallon of diesel is released, the mass of sulfur hexafluoride is one ten-thousandth that released in the New Mexico study. Yet the permeability of typical backfills is so much greater than seen in the New Mexico study that even this small mass of sulfur hexafluoride will likely be detected through use of the present invention.

Although the present invention has been described in detail, it should be understood that various changes, substitutions and alterations can be made hereto without departing from the spirit and scope of the invention as described by the appended claims.

What is claimed is:

1. A leak detection system for detecting leaks from a storage system containing a liquid less dense than water in which water has collected at the bottom of the storage system to form a water level and a separate liquid level, comprising:
   a tracer, the tracer comprising a substance soluble in the liquid to provide a liquid-tracer mixture upon introduction into the liquid, the tracer operable to provide a detectable component in the liquid-tracer mixture;
   a second detectable tracer, soluble in water, operable to mix with water and escape with the water through a leak in the storage system within the water level;
   a tracer introduction mechanism for introducing the tracers into the liquid; and
   a sampling device positioned near the storage system, the sampling device containing adsorption material for adsorbing tracer from the liquid-tracer mixture and the water-tracer mixture.

2. The system of claim 1, wherein the first tracer and the second tracer comprise a relatively volatile compounds capable of adsorption by the synthetic polymer adsorption material.

3. The system of claim 1 further comprising:
   a plurality of subsurface monitoring wells positioned near the storage system, each monitoring well containing a sampling device, wherein each monitoring well further comprises;

a casing having a generally cylindrical cross section;

a surface outlet through which the sampling device can enter and exit the monitoring well;

a plurality of slots formed along the vertical extent of the casing to allow tracer to more easily migrate into the monitoring well to contact sampling device; and wherein the plurality of subsurface monitoring wells are distributed about the storage system such that each monitoring well monitors less than a twenty foot radius about that monitoring well and further distributed in relatively close proximity to the storage system, and further wherein the plurality of monitoring wells are sunk in the backfill to a depth equal to the depth of the excavation; and wherein the sampling device further comprises a removable stainless steel mesh cylindrical container suspended within monitoring well below grade for holding the adsorption material.

4. The system of claim 1, wherein the liquid is a hydrocarbon fuel.

5. The system of claim 1, wherein the tracer comprises a compound selected from the group consisting of halogenated compounds, sulfur hexafluoride, chlorotrifluoromethane, and carbon tetrafluoride.

6. The system of claim 1, wherein the tracer comprises relatively volatile compounds having boiling points in the range of approximately −73 degrees Celsius to −128 decrees Celsius and greater than 150 degrees Celsius.

7. The system of claim 1, wherein the tracer introduction system further comprises;

a tracer container operable to hold the tracer prior to introduction into the storage system:

a plurality of transfer lines, each transfer line coupled at a first end to the container, each transfer line operable to provide a path for the tracer to flow from the container to the storage system, the transfer lines having a second end placed within the liquid near the bottom of the storage system;

a plurality of metal diffusers, each metal diffuser coupled to the second end of a transfer line to diffuse the tracer, thereby providing more uniform and rapid mixing of the tracer with the liquid; and a purge container operable to hold an inert purge gas, the purge container operable to connect to the plurality of transfer lines, the purge gas operable to flow through the transfer lines after the tracer has been introduced to force approximately all of the tracer out of the transfer lines and into the storage system.

8. The system of claim 1, wherein the adsorption material comprises a synthetic, hydrophobic, porous polymer material containing at least 50% divinyl benzene.

9. The system of claim 1, further comprising an analysis system for analyzing the adsorption material, the analysis system comprising a detector to detect the presence of tracer in the adsorption material.

10. The system of claim 9, wherein the detector comprises an electron capture detector, and wherein the electron capture detector can detect the tracer without having to first perform a water purge operation.

11. A method for detecting a leak from a storage system containing a liquid less dense than water in which water has collected at the bottom of the storage system to form a water level and a separate liquid level, the method comprising;

mixing a first tracer with the liquid in the storage system to form a liquid-tracer mixture;

mixing a second tracer, the second tracer being soluble in water, with the water to form a water-tracer mixture at the bottom of the storage system;

placing a sampling device containing an adsorption material near the storage system;

adsorbing the first tracer vapor onto the adsorption material within the sampling device;

adsorbing the second tracer vapor from the water-tracer mixture on the adsorption material; and analyzing the adsorption material for the presence of the second tracer to determine if a leak is present in the storage system.

12. The method of claim 11 wherein sealing the sampling device within a container further comprises sealing the container with a wrap, the wrap operable to form a hermetic seal to contain the vapors from the adsorption material within the container.

13. The method of claim 11 wherein obtaining a sample further comprises obtaining a sample of headspace vapor from the adsorption material contained within the sealed container.

14. The method of claim 13 wherein analyzing the sample further comprises analyzing the headspace vapor contained within sealed container, the analyzing further comprising;

loading the sealed container into a headspace autosampler coupled to a gas chromatograph;

injecting headspace vapors within the sealed container into gas chromatograph;

separating the headspace vapors on an analytical column in the chromatograph; and detecting tracer contained within the headspace vapors with a detector.

15. The method of claim 14 wherein detecting tracer in the headspace vapors further comprises using an electron capture detector to detect tracer contained within the headspace vapors.

16. The method of claim 11 wherein obtaining a sample further comprises washing the adsorption material with an organic solvent to form a liquid aliquot sample.

17. The method of claim 11, further comprising;

placing a plurality of subsurface monitoring wells around the storage system in relatively close proximity to the storage system and distributing the plurality of monitoring wells about the storage system such that each monitoring well monitors less than a twenty foot radius about that monitoring well;

suspending a sampling device within each of the plurality of monitoring wells at between two and four feet below grade; and forming the plurality of monitoring wells to have a casing with a generally cylindrical cross section, a surface outlet through which the sampling device can enter and exit the monitoring well, and a plurality of slots along the vertical extent of the casing to allow tracer vapor from the liquid-tracer mixture to more easily migrate into the monitoring well to contact adsorption material within the sampling device.

18. The method of claim 11, further comprising purging the transfer lines with an inert gas by flowing the inert gas through the transfer lines after the tracer has been introduced to force approximately all of the tracer out of the transfer lines and into the storage system.

19. The method of claim 11, wherein mixing a soluble tracer with the liquid further comprises mixing a tracer compound having a boiling point in a range of approximately −73 degrees Celsius to −128 degrees Celsius with a hydrocarbon fuel in a hydrocarbon fuel storage system.

20. The method of claim 11, wherein mixing a soluble tracer with the liquid further comprises mixing a tracer compound having boiling points greater than 150 degrees Celsius with a hydrocarbon fuel in a hydrocarbon fuel storage system.

21. The method of claim 11, wherein placing a sampling device containing an adsorption material further comprises placing a hydrophobic, porous, synthetic polymer material containing at least 50% divinyl benzene within the sampling device.

22. The method of claim 11, wherein the analyzing further comprises analyzing the adsorption material for the presence of the first tracer to determine if a leak is present in the storage system.

* * * * *